United States Patent [19]

Lubetzky et al.

[11] Patent Number: 4,751,812
[45] Date of Patent: Jun. 21, 1988

[54] STALK PULLER AND SHREDDER MACHINE

[76] Inventors: Yacov Lubetzky, 4 Barak Street, Tel Aviv; Zeev Svavolsky, 13 Hayarmuch Street, Ramat Hasharon, both of Israel

[21] Appl. No.: 880,787

[22] Filed: Jul. 1, 1986

[30] Foreign Application Priority Data

Jul. 24, 1985 [IL] Israel ................................. 75897

[51] Int. Cl.⁴ ............................................. A01D 49/00
[52] U.S. Cl. ...................................... 56/504; 56/14.3; 171/58; 171/61
[58] Field of Search ............. 56/63, 500, 504, DIG. 1, 56/DIG. 4, 14.3; 171/56, 58, 61

[56] References Cited

U.S. PATENT DOCUMENTS

| | | | |
|---|---|---|---|
| 2,660,013 | 11/1953 | Priestley | 171/58 |
| 2,924,283 | 2/1960 | MacPhee | 171/58 |
| 2,940,528 | 6/1960 | Magnuson | 171/58 X |
| 3,160,214 | 12/1964 | Ruozi | 171/58 |
| 3,400,527 | 9/1968 | Woodring | 56/504 X |
| 3,437,152 | 4/1969 | Barrentine | 171/58 |
| 4,015,667 | 4/1977 | Ruozi | 171/58 X |
| 4,077,192 | 3/1978 | Klinner et al. | 56/DIG. 1 |
| 4,160,356 | 7/1979 | Mathews | 56/DIG. 4 |
| 4,350,207 | 9/1982 | Ben-Dor | 171/58 |

*Primary Examiner*—Stephen J. Novosad
*Assistant Examiner*—John F. Letchford
*Attorney, Agent, or Firm*—Ostrolenk, Faber, Gerb & Soffen

[57] ABSTRACT

A machine for shredding stalk, particularly that of cotton, is disclosed which comprises a wheeled frame adapted to be trailed along crop rows, a power driven unit, and a stalk puller device. The device comprises a pair of frictionally coupled rollers, at least one of which being rotatably driven by the power unit about an axis forming an acute angle with respect to the vertical. Stalk which becomes engaged between contacting circumferential portions of the rollers is pulled, plucked from the ground and fed in a generally backwards direction by the rollers. A first shredding device is provided comprising a series of cutting knives rotating in a direction away from the rollers. The cut stalk becomes airborne and is conveyed backwards along a first, streamlined shroud member overhanging the first shredding device. A second shredding device of similar construction is installed, operating in tandem with the first shredder, whereby the stalk is cut into small chips and discharged from the machine.

5 Claims, 8 Drawing Sheets

STALK PULLER AND SHREDDER MACHINE

BACKGROUND OF THE INVENTION

The present invention relates to agricultural machinery generally known under the category of shredders, namely equipment used to dispose of stalk of cotton or other crops which are left in the field after harvesting. More particularly the invention concerns root and stalk shredders which are adapted both to pluck the complete plant from the ground—or what's left of it after the harvest—and to process same through a shredding operation wherein the cut plants are left in the field in the form of chips.

There are known in the art of harvesting shredders for cotton or similar crops which comprise plowing means for digging out the stalk, which are then lifted and transferred into a rotary cutting device for shredding the stalks and roots (cf. U.S. Pat. Nos. 4,015,667 and 3,160,214), with or without further ground treating means for rebedding the soil.

According to another known method, the plant stems are first cut short to the ground and then conveyed to the shredding process while plowing means are used for digging the roots and preparing the ground for the next season's crops.

These known devices and equipment are complicated in construction and expensive in operation and service; particularly with respect to the last-mentioned example, they do not solve the problem of nematodes, which are left in the roots and may affect the next season's crops. It is thus the general object of the present invention to provide equipment for the purposes in question that will be of simple construction and operation and less costly. It is a further object of the invention to employ, rather than digging or plowing means, pulling or plucking means that will operate without forceful contact with the ground. It is a further object of the invention that the equipment provided will include two stages of shredding, coarse and fine, whereby the cut stalk will be conveyed from one stage to the other in an airborne fashion.

SUMMARY OF THE INVENTION

According to a general aspect of the invention, there is provided a stalk puller and shredder machine comprising a wheeled frame adapted to be trailed along crop rows, a power driven unit, and a stalk puller device. The device comprises a pair of frictionally coupled rollers, at least one of which being rotatably driven by the power unit about an axis forming an acute angle with respect to the vertical. Stalk which becomes engaged between contacting circumferential portions of the rollers is pulled, plucked from the ground, and fed in a generally backwards direction by the rollers. A first shredding device is provided comprising a series of cutting knives rotating in a direction away from the rollers. The cut stalk becomes airborne and is conveyed backwards along a first, streamlined shroud member overhanging the first shredding device.

BRIEF DESCRIPTION OF THE DRAWINGS

Further constructional details and advantages of the invention will become more clearly understood in the light of the ensuing description, of a preferred embodiment of the invention, given by way of example only, with reference to the accompanying drawings, wherein.

DETAILED DESCRIPTION OF THE PREFERRED EMBODIMENT

Figure 1:
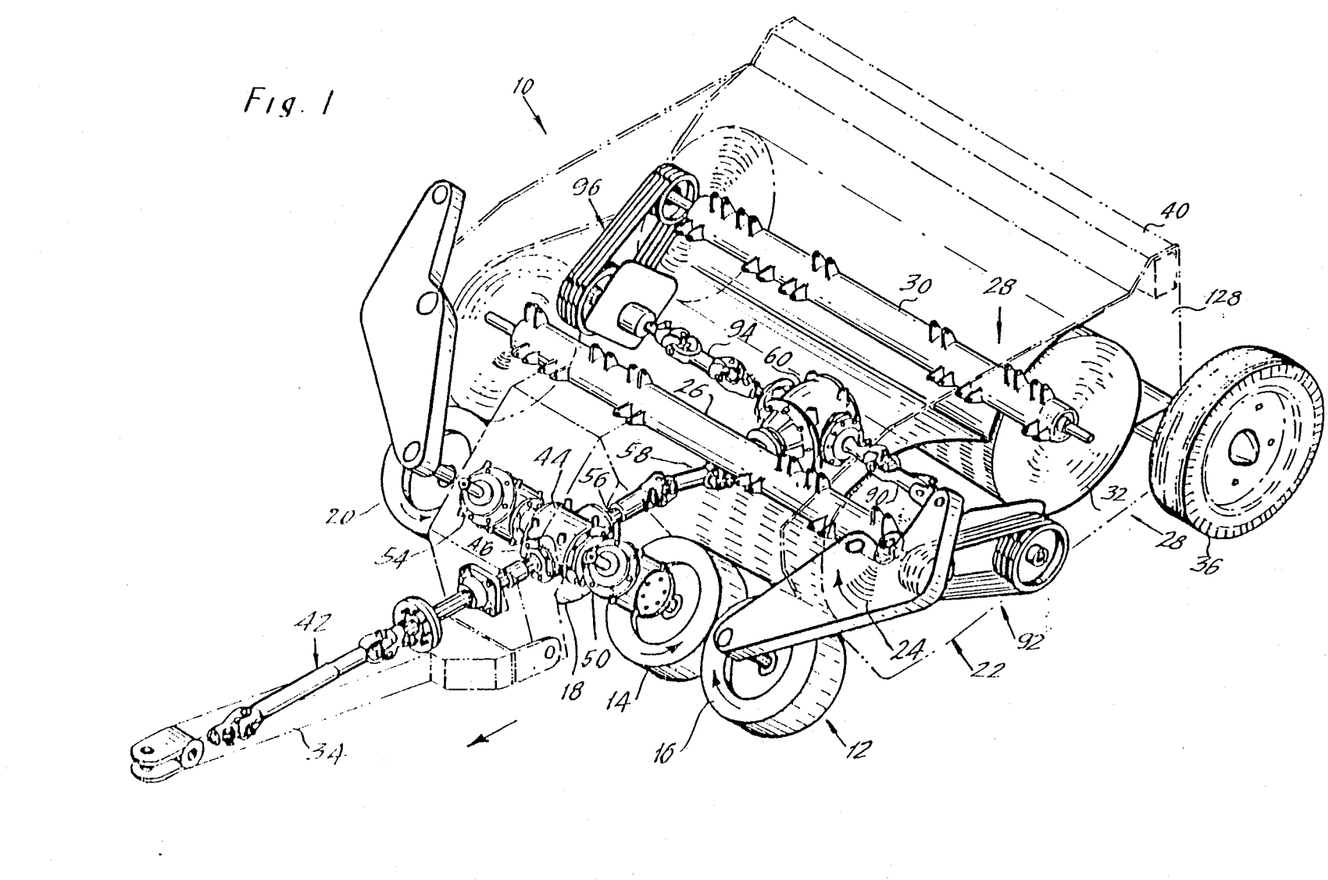
FIG. 1 is a general, three-dimensional schematic view of the machine featuring the principles of the present invention.
Figure 2:
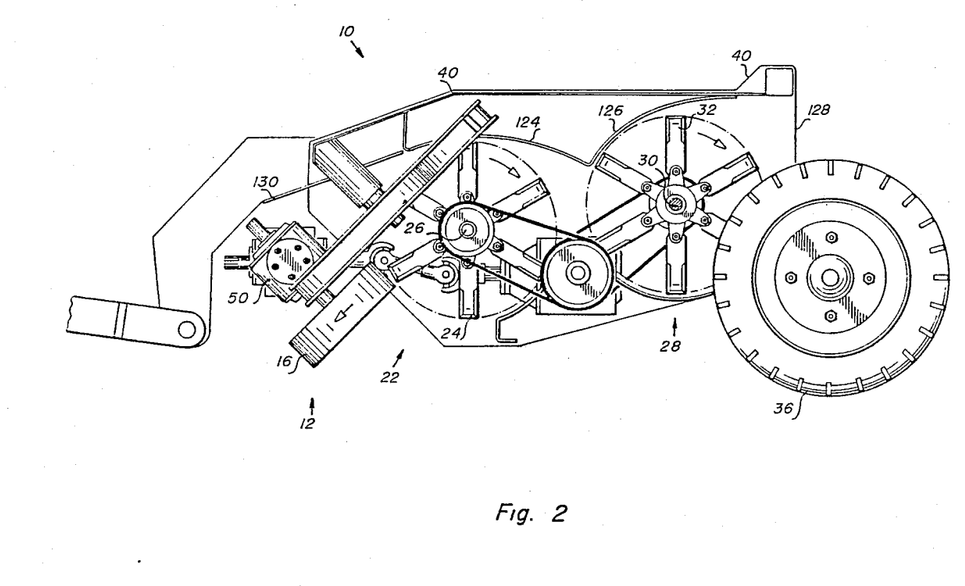
FIG. 2 is a schematic side-view of the machine of FIG. 1.
Figure 3:
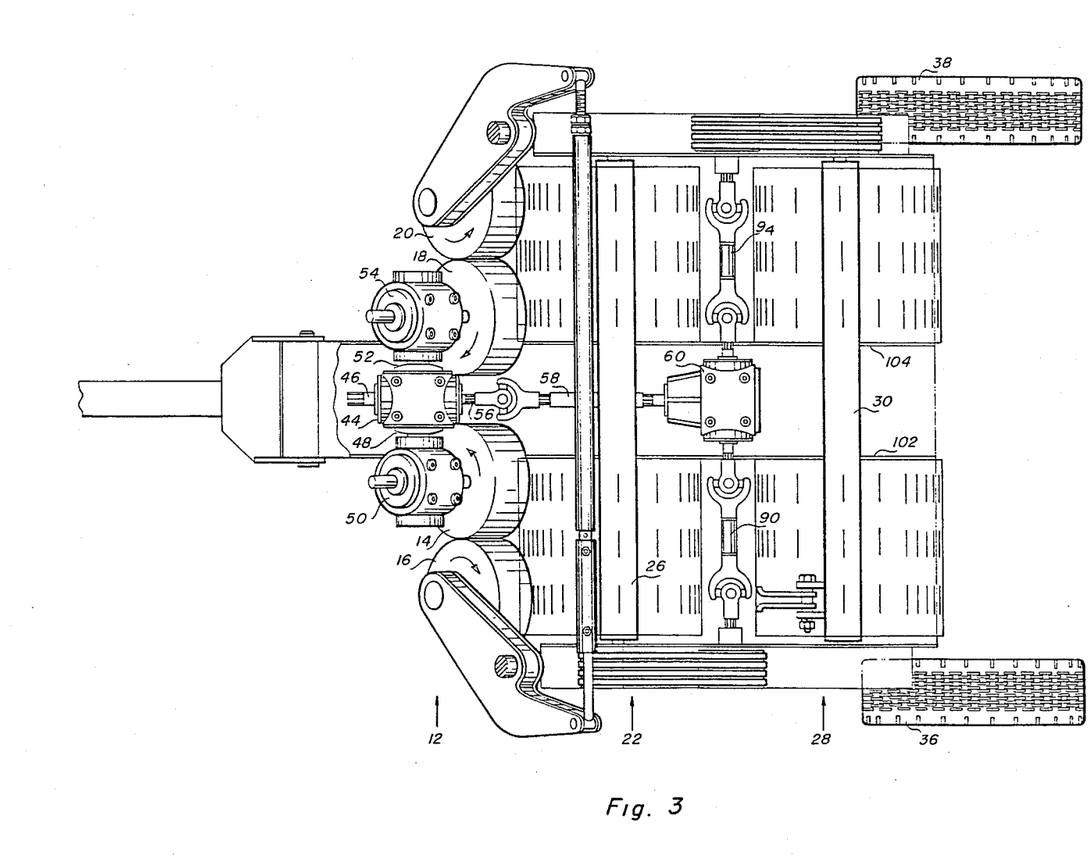
FIG. 3 is a top view of FIG. 2.

As generally shown in FIGS. 1-3, the puller and shredder machine, generally denoted 10 comprises three main sub-assemblies, as follows: A pulling system denoted 12, essentially comprising oppositely rotatable, frictionally contacting rollers 14, 16 and (optionally) 18 and 20, whose axes are tilted at an acute angle with the vertical; a first, coarse shredding system generally denoted 22, comprising a series of knives 24 rotating about a central shaft 26 (see FIG. S); and a second, fine shredding system 28 including shaft 30 and rotary knives 32.

As further schematically shown, the machine as a whole is adapted to be tractor-trailed and powered by a tow bar 34, is provided with ground wheels 36, 38, and is accommodated within a housing 40.

The sub-assemblies or systems of the machine will be now described in more detail. Driving power to the pulling rollers 14 and 18 is transferred from the power take-off of a tractor (not shown) via a transmission shaft generally indicated 42, details of which need not be described in greater detail. There is provided a central transmission box 44 comprising input 46 and three output couplings, namely 48 (see FIG. 3) for gear transmission device 50 of the roller 14; coupling 52 of gear transmission device 54 for the puller roller 18; and coupling 56 connected via universal shaft 58 to gear tranmission device 60, which will be described in more detail below in connection with the shredder first and second systems.

Rollers 14 and 18 are thus positively driven in opposite directions as denoted by the respective arrows; rollers 16 and 20 are, as aforesaid, frictionally coupled to their counterpart rollers 14 and 18 and are thus driven in opposite directions for effecting clamping and pulling of stalk introduced therebetween, as explained further below in connection with FIG. 6.

Figure 4:
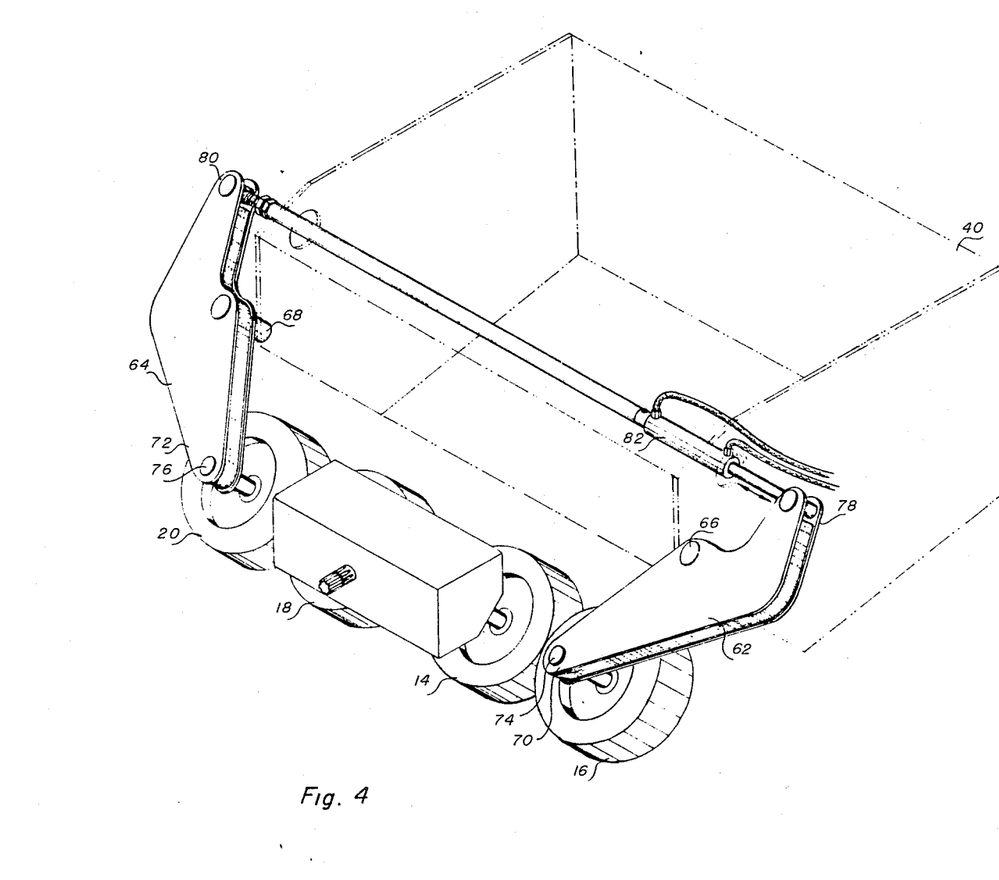
FIG. 4 shows the constant pressure clamping system of the rubber rollers puller system.

Rollers 14–20 are preferably made of rubber or like elastic material, and hence are subject to excessive wear; in order to reduce undue damage to the peripheral surfaces of the rollers, there is provided, according to another aspect of the invention, a clamping system more clearly shown in FIG. 4. A pair of arm members 62 and 64 are pivotably mounted on fixed axles 66 and 68 at a central portion thereof. One side of the arms, marked 70 and 72, provides mountings for rotating axles 74 and 76 of the non-driven rubber rollers 16 and 20, respectively, while the other ends 78 and 80 of the arms are connected to each other by a hydraulic cylinder and piston device 82, as shown. By controlling the pressure within the cylinder of the device 82, a controlled clamping force of the rollers 16 and 20 against the rollers 14 and 18, respectively, is obtained.

Due to this arrangement, a substantially constant surface pressure between the rollers is assured, with an option to increase or decrease such pressure in immediate correlation with the working conditions of the machine, e.g. the type of stalk which is processed; the sizes of roots and/or type of soil; and the possibility to give way in case of irregular or extra-large solid bodies that may become clamped between the rollers.

However, instead of this arrangement, spring loaded or counterweight devices known per-se in the art may be employed.

Referring back to the other assemblies of the machine, there is best seen in FIG. 3 that gear transmission device 60 is coupled through a universal joint shaft 90 at one side thereof to a pulley system 92 (FIG. 1) drivingly coupled to shaft 26 of the first shredding system 22 and, at its other side via shaft 94 and pulley transmission 96, to shaft 30 of the second shredding system 28.

It should be emphasized in this very context that the above described, dual-type structure of the machine is optional, although preferable in terms of better balance and less hazard of clogging or accumulation of cut stalk at one side of the machine would it not be divided into two independent sections for servicing two parallel rows of crops. To this end there are provided partitions 102 and 104 at both sides of the central gear transmission 60, which also isolate the gear from the chipped stalk and dust that may affect its operation.

Figure 5:
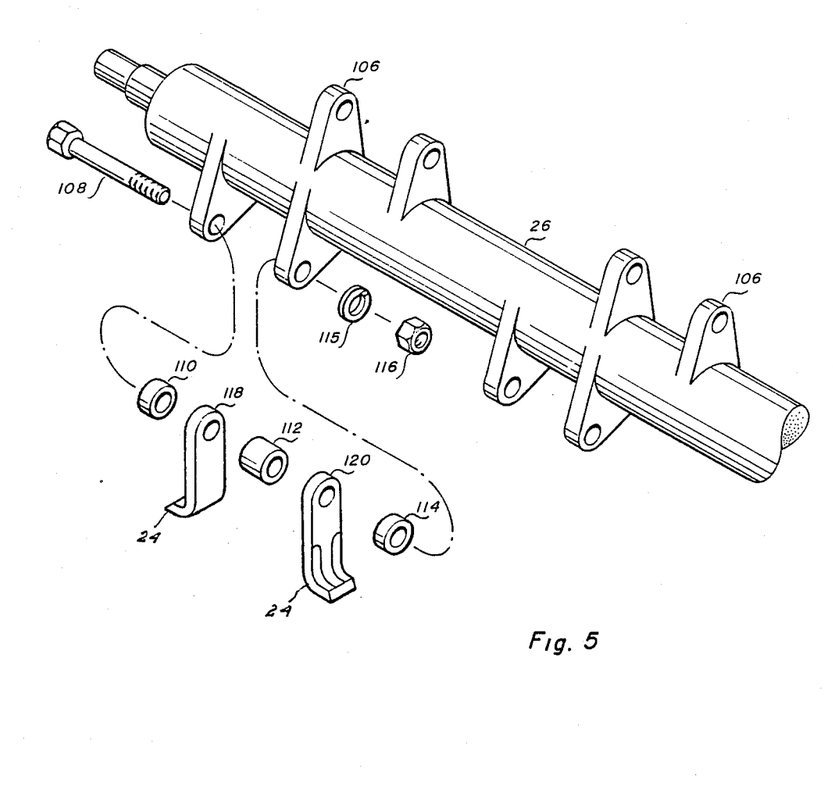
FIG. 5 illustrates the arrangement of the rotary knives system.

The knife devices 24 and 32 of the first and second shredding systems 22 and 28 are preferably made as shown in FIG. 5, namely wherein the shaft, say 26, comprises a series of ears 106 pivotably carrying by bolts 108, and washers 110, 112 and 114, spring ring 115 and nut 116, a pair of oppositely bent knife members 118 and 120. This structure, which is known per-se, is advantageously implemented in the shredding devices according to the invention to provide the necessary aerodynamic conveying effect of the cut stalk, as will be described in more detail below. The shafts and knife structure is identical for the systems 22 and 28.

Now last but not least, there is provided a streamlined shroud or hood member 124, which is generally concave seen from underneath thereof. The shroud provides a streamlined surface, designed according to optimal aerodynamic considerations for conveying cut stalk pieces in an airborne fashion from the first, coarse section to the second, fine shredding section. A second shroud member 126 is provided as shown, with its aerodynamic design calculated to further convey chips of stalk away from the second shredding device 28 and out of the machine via outlet 128.

Figure 6A:
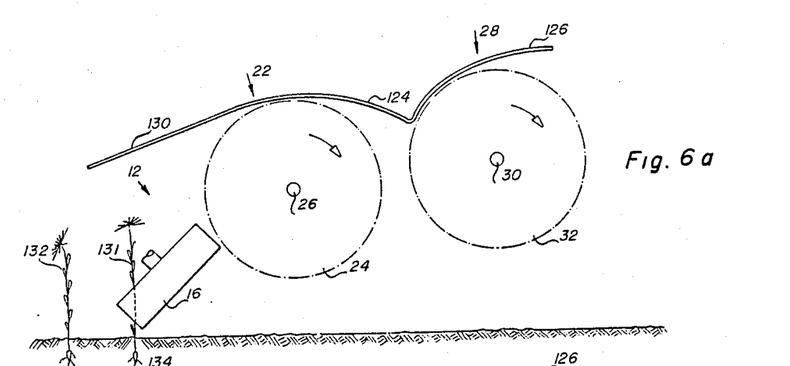
FIGS. 6a–6f illustrate consecutive stages of stalk pulling and shredding processing by the machine of the present invention.
Figure 6B:
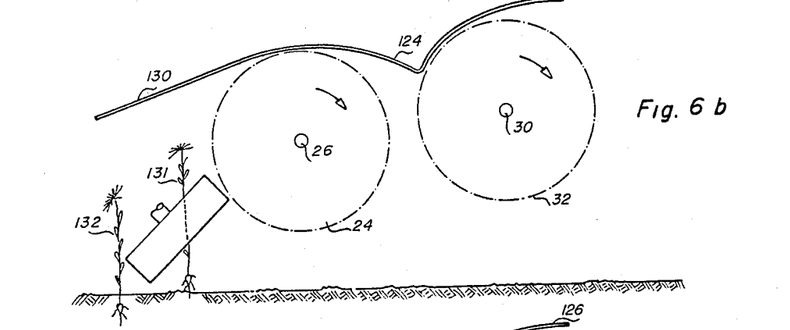

If necessary, a shroud member 130 is provided between the pulling device 12 and the first shredding device 22. The operation of the machine will now be described with particular reference to FIGS. 6a–6f. Let us assume that the machine 10 is trailed along rows of stalk, two stems of one row are shown in FIG. 6a designated 131 and 132. Stem 131, with its root 134 is about to be clamped between friction rollers 16 and 14. Now, bearing in mind that the rollers are kept in a tilted position forming an acute angle with the vertical, a force-component directed upwardly is attained, causing the gradual pulling of the stem from the ground, as shown in FIG. 6b, which will eventually cause the complete plucking thereof from the ground including the root 134. The plucked stem will become thrown against the high speed rotating knives 24 of the first shredding system 22 and cut into, say, four pieces 136, 138, 140, and 142.

Figure 6C:
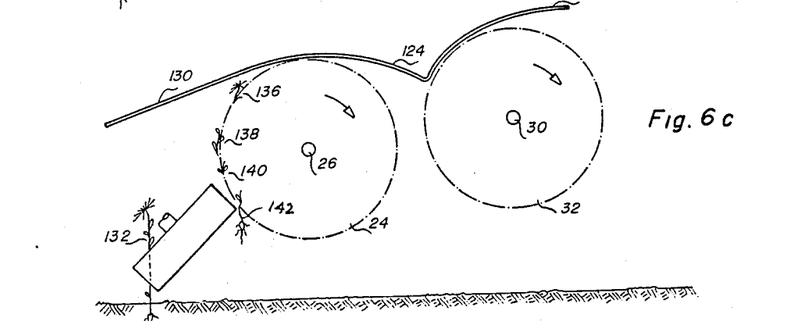
Figure 6D:
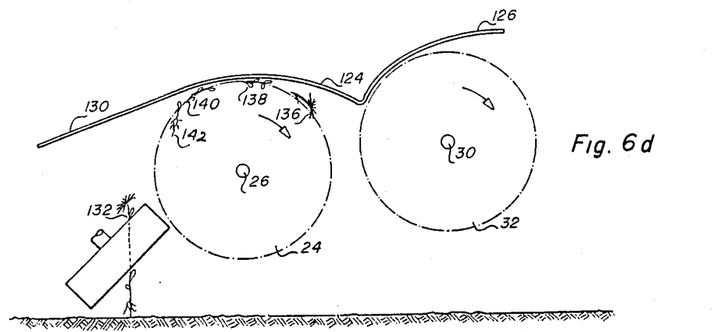
Figure 6E:
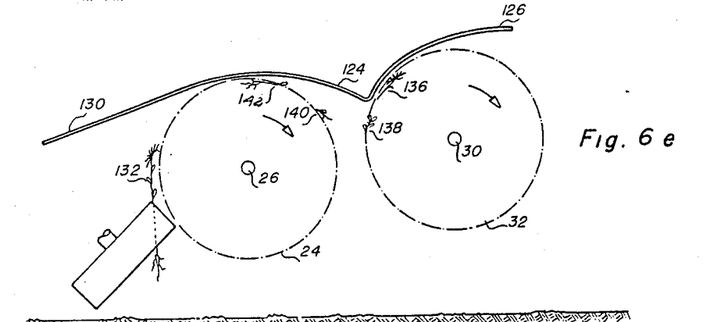
Figure 6F:
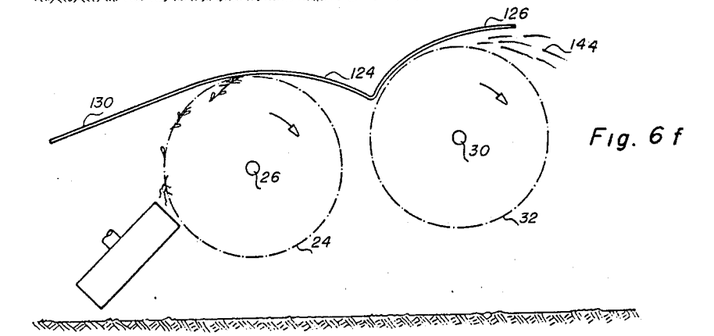

As shown in FIGS. 6c and 6d, the cut pieces 136–142 are carried by the airstreams created by the rotating knives 24 and become airborne against the shroud 124. The shredded pieces will continue to be driven aerodynamically along the streamlined shroud 124 into the cutting surface of the knives 32 of the second cutting device 28, with its hood 126. At this stage the cut pieces are further shredded into chips 144 and are aerodynamically driven out of the system to complete the shredding of the stalk 131. In the meantime the process repeats itself with respect to the next-in-line stalk 132 as schematically illustrated in the FIGS. 6c–6f.

It has thus been established that the puller-shredding machine according to the present invention presents novel and improved operational characteristics heretofore unknown with respect to conventional devices, specifically, but not exclusively, with respect to its unique transmission driving mechanisms and the airborne fashion by which cut stalk is carried from one stage to the other.

Figures 7, 8:
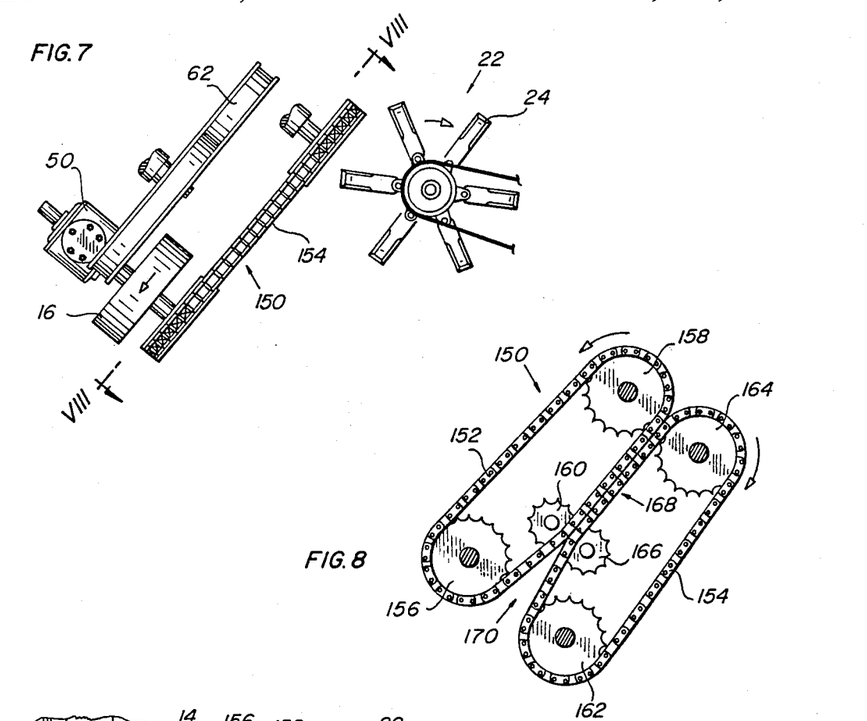
FIG. 7 shows, in a side view, a modification applied to the machine.
FIG. 8 is a view taken along line VIII—VIII of FIG. 7.
Figure 9:
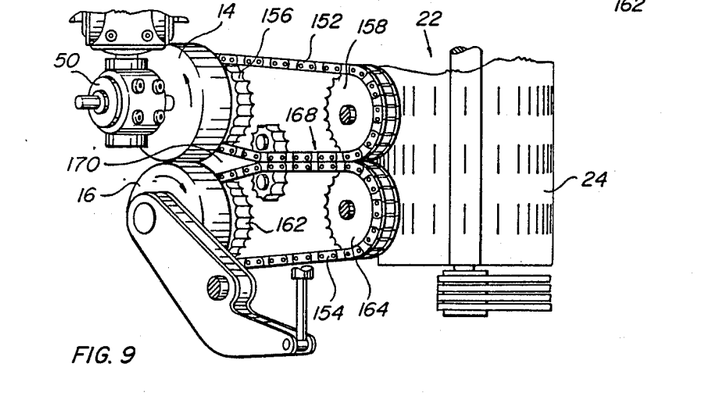
FIG. 9 is a top view of FIG. 7.

It will be readily appreciated by those skilled in the art that various changes, modifications, and variations are readily applicable to the above exemplified embodiment of the invention. For example, it may become necessary, for more effective feeding of the plucked stalk to the first shredding system, to separate the rollers from the knives. Accordingly, in FIGS. 7–9, there are shown the first pair of rollers 14, 16 and the first shredding system 24. (cf. FIG. 2).

A conveyor system generally designated 150 is provided, comprising a pair of belts or sprocket chain closed loops 152, 154 driven by the transmission device 50 of the roller 14. The chain 152 is driven by sprocket wheel 156 and is coupled to sprocket wheel 158 and tension wheel 160. The chain 154 is associated with sprockets 162, 164 and tension wheel 166, so that between the respective wheels 160, 166 and wheels 158, 164 a straight conveyor stretch 168 with a covergent charging or feeding region 170 are formed. As readily understood in view of the foregoing description, stalk picked up by the rollers 14, 16 will first become clamped between the chains 152, 154 and carried along the stretch 168 up to the point where the knives 26 will take over in the same manner as described in conjunction with FIG. 6 with respect to the rollers 14 and 16 operation proper.

This and other changes and modifications should be deemed to be included in the scope of the present invention as defined in and by the appended claims.

What is claimed is:

1. A stalk puller and shredder machine comprising:
   a wheeled frame adapted to be trailed along crop rows;
   a power driven unit;
   a stalk puller device comprising a pair of frictionally coupled rollers, at least one of the rollers being rotatably driven by the the power unit about an axis forming an acute angle with respect to the vertical, so that a stalk which becomes engaged between contacting circumferential portions of the rollers is pulled, plucked from the ground, and fed in a generally backwards direction;

a first shredding device for receiving the stalk, comprising a first series of cutting knives rotating in a direction away from the rollers; a first horizontally rotatable shaft to which the said knives are pivotally connected;

a first, streamlined shroud member overhanging the first shredding device so that the cut stalk becomes airborne and is conveyed backwards therealong;

a second shredding device comprising a series of cutting knives rotating in a direction away from the first shredding device;

a second, streamlined shroud member overhanging the second shredding device so that cut stalk becomes airborne and is conveyed backwards therealong; a second horizontally rotatable shaft to which the said knives are pivotally connected;

the shaft of the second shredding device extending parallel to the shaft of the first shredding device at a level higher than that of the first shaft.

2. The machine as claimed in claim 1, wherein the first shroud is generally concave seen from underneath thereof having a radius of curvature greater than the rotation radius of the first shredding device knives.

3. The machine as claimed in claim 1, wherein the second shroud is generally concave seen from underneath thereof having a radius of curvature greater than the rotation radius of the second shredding device knives.

4. The machine as claimed in claim 1 further comprising a conveyor system between the stalk puller device and the first shredding device.

5. The machine as claimed in claim 4 wherein the conveyor system comprises a pair of juxtapositioned conveyor belt loops arranged in a common plane parallel to and below the radial plane of the rollers in such a manner that the plucked stalk becomes clamped between and carried by respective stretches of the conveyor loops, and fed to the first shredding device.

* * * * *